(12) United States Patent
Greenberg

(10) Patent No.: US 6,646,819 B2
(45) Date of Patent: Nov. 11, 2003

(54) INTERACTIVE DYNAMIC IMAGING

(76) Inventor: Gary Greenberg, 520 Washington Blvd. #422, Marina Del Ray, CA (US) 90292

( * ) Notice: Subject to any disclaimer, the term of this patent is extended or adjusted under 35 U.S.C. 154(b) by 52 days.

(21) Appl. No.: 09/945,299

(22) Filed: Aug. 31, 2001

(65) Prior Publication Data

US 2002/0027724 A1 Mar. 7, 2002

Related U.S. Application Data

(60) Provisional application No. 60/230,053, filed on Sep. 1, 2000.

(51) Int. Cl.[7] .............................. G02B 9/08; G02B 26/02
(52) U.S. Cl. ..................... 359/738; 359/234; 359/236
(58) Field of Search ................................ 359/738, 739, 359/740, 234, 236

(56) References Cited

U.S. PATENT DOCUMENTS

| | | | | | |
|---|---|---|---|---|---|
| 5,345,333 | A | * | 9/1994 | Greenberg | 359/389 |
| 5,488,362 | A | * | 1/1996 | Ullman et al. | 341/20 |
| 5,706,128 | A | * | 1/1998 | Greenberg | 359/385 |
| 6,020,993 | A | * | 2/2000 | Greenberg | 359/363 |
| 6,215,578 | B1 | * | 4/2001 | Lin | 359/292 |
| 2002/0027724 | A1 | * | 3/2002 | Greenberg | 359/738 |
| 2002/0159167 | A1 | * | 10/2002 | Greenberg | 359/738 |

* cited by examiner

Primary Examiner—David N. Spector
(74) Attorney, Agent, or Firm—H. Michael Brucker

(57) ABSTRACT

A manually controlled, variable-size, variable angular position, sector-shaped optical mask for use at an objective aperture of an optical imaging system to permit an object to be viewed from selected angles and directions.

18 Claims, 2 Drawing Sheets

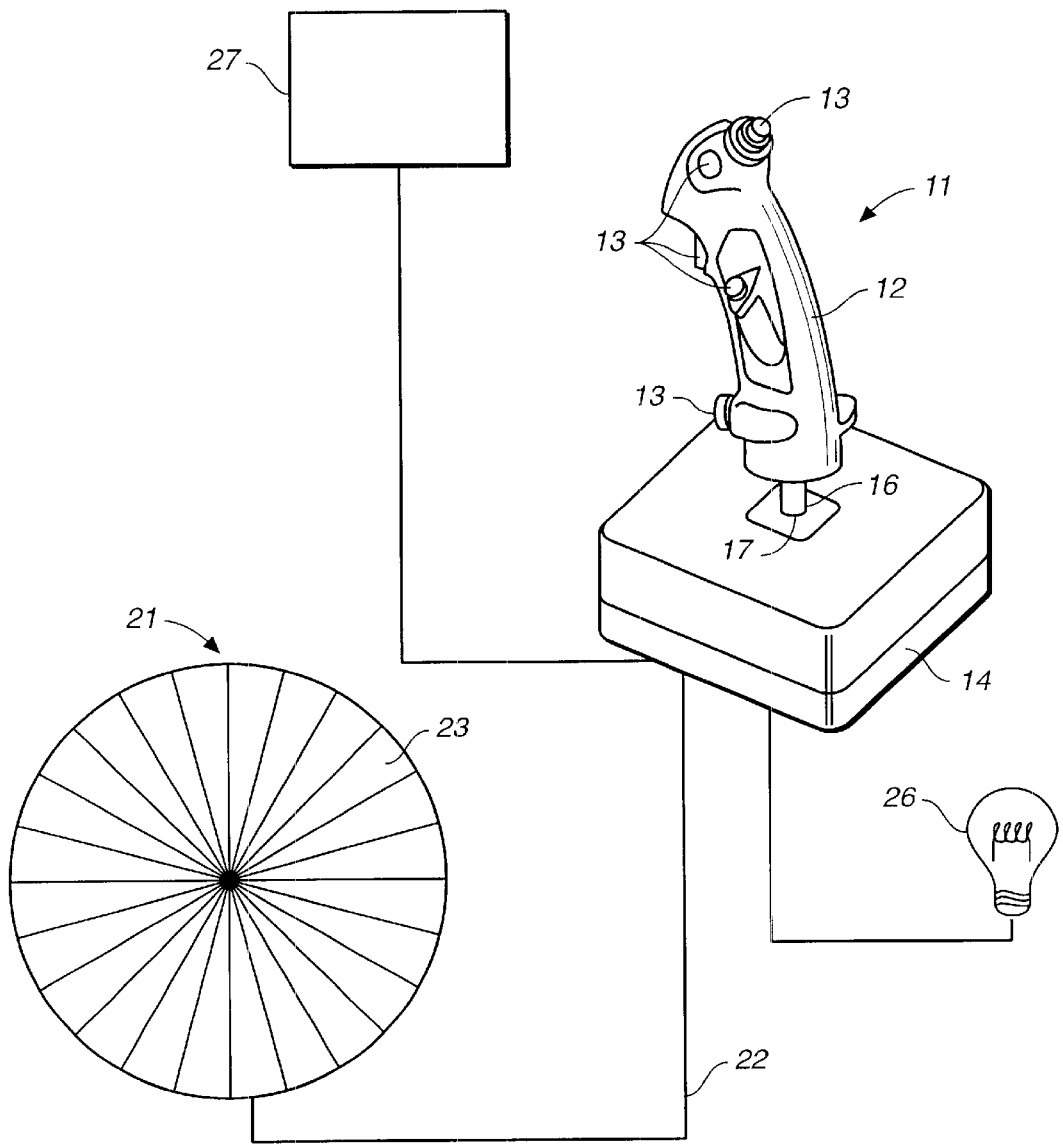
FIG._1

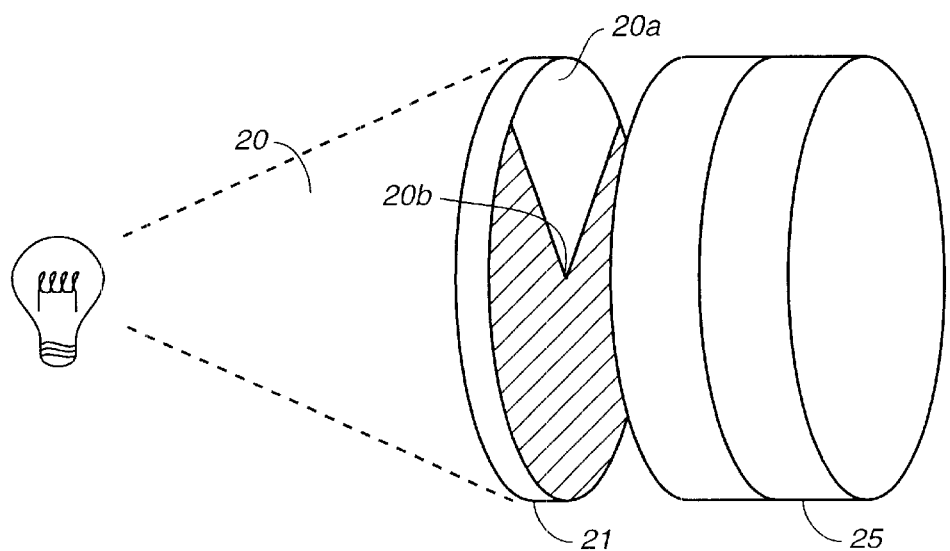
FIG._2
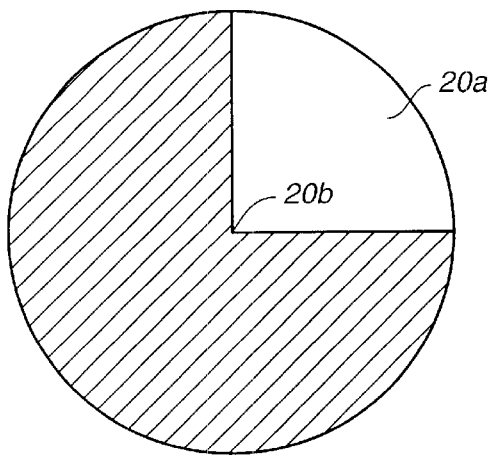 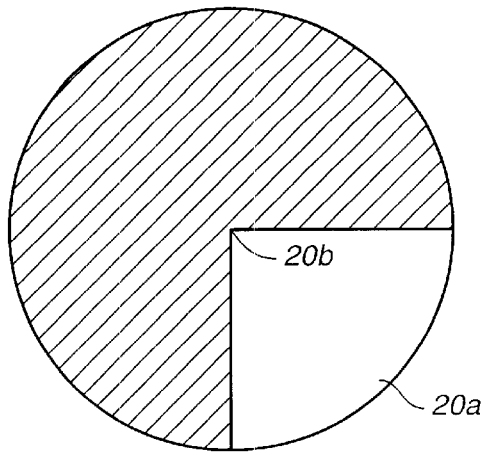
FIG._3a    FIG._3b

INTERACTIVE DYNAMIC IMAGING

This application claims the benefit of U.S. Provisional Application No. 60/230,053.

FIELD OF THE INVENTION

The present invention is useful in optical systems, and in particular, in optical systems that create a perceivable image of an object by the transmission of radiation through a lens. The present invention has particular application to light microscopes that use an iris diaphragm to enhance certain characteristics of the image created in the microscope. The broad concepts of the invention are particularly useful in cameras, as well

BACKGROUND OF THE RELATED ART

A standard element of almost all modern light microscopes is a variable diameter (diaphragm) iris disposed at the aperture of the objective lens or at a plane conjugate to the objective aperture to control the area of the lens that passes light. To clearly distinguish over the prior art, the term "aperture mask" is used instead of "iris diaphragm" when referring to the mechanism that shapes a beam of light incident on a lens. As used herein, the term "objective aperture" shall mean, and will be understood by those skilled in the art to be, a lens aperture (or back focal plane) or any aperture conjugate to a lens aperture.

The prior art teaches that by effectively decreasing the area (diameter) of the lens that passes light by closing down the iris diaphragm, the contrast and depth of field of the perceived image is increased, while light intensity and resolution are decreased. Iris diaphragms used for the foregoing purpose have not changed materially for many decades. Investigators using a microscope with such an iris are able to adjust the iris to obtain the best combination of contrast, depth of field and resolution for the particular investigation being conducted.

The degradation of resolution by increasing contrast and depth of field with an iris diaphragm is a result of the iris blocking light from the outer portions of the lens, thereby reducing the working numerical aperture (NA) of the lens and hence reducing the higher order image-forming diffraction wavelets that pass through the lens. This phenomenon is explained in detail in Dr. Greenberg's U.S. Pat. No. 5,345,333.

SUMMARY OF THE INVENTION

The present invention provides a manually controlled dynamic aperture mask for an image-forming lens that: (a) increases image contrast and depth of field without compromising image resolution; (b) generates motion parallax to create a 3D image; (c) creates hand-eye-brain feedback (through motion parallax) that unambiguously resolves foreground from background, thus producing a more accurate 3D image; (d) permits 2D viewing from any selected angle and view position; and (e) allows 2D and stereo pair photographs to be taken from any angle and position (not just along a single axis).

A manual control module, such as a joystick, mouse, keyboard or the like, controls the size and position of a sector-shaped mask aperture. The size of the sector-shaped aperture in the mask determines the angle of view, while the angular position of the aperture sets the position of view. When the mask is effectively removed from the path of the image-carrying light beam, the object is viewed from directly above (along a normal to the object), as is typical in prior art imaging devices. When a mask with a sector-shaped aperture is disposed in the path of the beam, the angle of view is oblique to the optical axis in an amount dependent on the size of the sector-shaped aperture. As the size of the aperture decreases, the angle oblique to the normal increases. Rotation of the mask and sector-shaped aperture changes the direction from which the object is viewed at the angle of view determined by the size of the aperture. Manipulation of the joystick to sweep a selected sector mask aperture through an arc creates motion parallax, which creates a viewable 3D image without the need for special 3D display equipment.

The manual control of the dynamic aperture mask permits the hand-eye-brain connection to resolve any ambiguities between foreground and background in a 3D image produced as described above.

The variability of the size of the aperture mask permits the investigator to finely tune the system to create the best match between the object under investigation and the optical system imaging that object.

The terms "sector" or "sector of a circle" are used herein to mean that portion of a circle which includes an arc of the circle and the center of the circle. The terms "aperture" or "opening" as used herein mean light transmissive, as opposed to opaque, and do not necessarily mean without physical structure.

Because of the particular geometry of a sector of a circle, a single mask having a variable-size, sector-shaped aperture can be used with lenses of different numerical apertures and magnifications.

Another advantage of the present invention is that the light beam which passes through the sector-shaped aperture of the mask is oblique with reference to the optical axis of the lens, thus having functional capabilities well beyond those of a co-axial beam emanating from a standard prior art circular, co-axial, variable-diaphragm iris.

By positioning the sector-shaped aperture of the mask of the present invention at different locations about the optical axis of the objective lens, the object is viewed from different directions or oblique angles relative to the optical axis. The degree of obliquity is further controlled by the angular opening of the sector-shaped aperture. For example, a 90-degree mask aperture will produce a greater angle of obliquity than a 180-degree mask aperture.

When a particular direction of view reveals details of interest, stereo pair photographs can be taken of that view; one from the selected angle and one from an angle±180 degrees thereto.

Accordingly, it is an object of the present invention to provide a manually controlled dynamic, sector-shaped aperture mask for selecting angled views of an object from different points of view and creating 3D images of the object.

It is a further object of the present invention to provide a manually controlled dynamic, sector-shaped aperture mask which permits stereo pair photographs of an object to be taken from different angles of view.

Another object of the invention is to provide an improved and universal mask that functions equally with lenses of different numerical apertures and magnifications.

It is a further object of this invention to provide the user with hand-eye-brain feedback in order to produce a more accurate 3D image of the object.

It is still another object of the invention to create 3D images by motion parallax so that a 3D image can be perceived without the need for special 3D display equipment. The advantage is that an observer can perceive a 3D image, even if the observer is viewing the object with only one eye. Thus, the motion parallax 3D image can be recorded and presented on standard video equipment.

Other advantages and objects of the invention will be apparent to those skilled in the art from the description of the invention which follows with reference to the following drawings.

BRIEF DESCRIPTION OF THE DRAWING

FIG. 1 is a schematic drawing of the invention;

FIG. 2 is a perspective view of the mask of the present invention in relation to a light source and lens;

FIG. 3a is a plan view of a mask of the present invention with an aperture size of 90 degrees;

FIG. 3b is the same as FIG. 3a, with the aperture in a different position.

DETAILED DESCRIPTION OF THE INVENTION

In my pending application Ser. No. 09/552,181, I describe the advantages of utilizing a mask having a sector-shaped aperture over an iris diaphragm and methods of utilizing the same. That pending application is incorporated herein by this reference.

Referring to FIG. 1, a manually operated manipulator in the form of a joystick 11 includes a handle 12 which, in operation, is grasped by an operator for movement. The handle 12 sits on a coupling post 16 having a base 17. The handle 12 can move radially and angularly about a circle having the base 17 as its center. The handle 12 has numerous switch actuators 13 in the form of pushbuttons and triggers that are readily actuated by the hand of the operator grasping the handle 12. The position of the handle 12 in space is translated into an electrical signal by a signal generator 14 which communicates with handle 12 through coupling post 16. The actuation of one or more of the switches 13 also affects the output of the signal generator 14.

The use of a joystick to generate electrical control signals is a well-developed art and particularly known to those in the video game field. In the preferred embodiment of the present invention, rather than directing signals to a video game or the like, the joystick 11 generates an electrical signal that controls an LCD mask 21 through a communication link 22.

The communication link 22 can be an electrical signal-carrying wire or a wireless communication link, depending on the application.

The LCD mask 21 is formed from a plurality of sector-shaped LCDs 23, which together form a complete circle. There are thirty-two LCDs 23, which number is chosen for purposes of illustration only. It will be obvious to those skilled in the art that a greater or lesser number of LCDs 23 can be used, depending on the application.

The signal generator 14 includes means for creating a signal that uniquely corresponds to the angle and radial position of the joystick handle 12 (as made known to the signal generator 14 through post 16), as well as means for creating signals that control the LCDs 23. The use of look-up tables or other computer software and hardware components and techniques well known to those having skill in the art can be employed in a variety of known combinations to provide the signal generator 14 with the functional capabilities described herein.

Referring to FIG. 2, in operation, the LCD mask 21 is disposed in the path of an image-forming light beam 20 which passes through the aperture 21a of LCD mask 21 before reaching a lens 25. The mask 21 is preferably located at the rear aperture of the lens or a plane conjugate thereto.

Referring once again to FIG. 1, the LCDs 23 can be selected individually to be either opaque to light or transparent to light. A light beam incident on mask 21 is unobstructed when all of the LCDs 23 are in their transparent mode. Positioning the handle 12 of joystick 11 selects certain adjacent LCDs 23 to be in their opaque mode, while the remaining LCDs 23 are in their transparent mode, thereby forming a sector-shaped aperture that passes light, as illustrated in FIGS. 3a and 3b. The aperture passing light can be as small as a single LCD 23, as large as 360 degrees less one LCD 23, or any size in between depending on the desired angle of view. In the preferred embodiment of the invention, the size of the sector-shaped mask aperture is a function of the tilt angle of the joystick handle 12 in any direction.

In my above-referenced application Ser. No. 09/552,181, I explain the advantages of certain mask aperture geometry. In another co-pending patent application Ser. No. 09/552, 180, I explain the advantages of rotating a sector-shaped aperture in a mask disposed in the path of a light beam in an imaging system, and in particular, the generation thereby of motion parallax which gives rise to a viewable 3D image. Once again, rather than repeating the content of the aforementioned application, it is incorporated herein by this reference.

When the signal from signal generator 14 provides that none of the LCDs 23 are opaque and, thus, all of a light beam incident upon the mask passes through the mask, the typical axial illuminated image-viewing conditions prevail—the image is viewed from directly above (along the optical axis) which corresponds to the middle default position of the joystick 11.

When selected ones of the LCDs 23 are caused to be opaque, the object is viewed from some angle off of the optical axis. The angle off of the optical axis from which the image is viewed is a function of the size of the sector-shaped aperture in mask 21 which passes light. For example, should one-half of the LCDs 23 be opaque and the other half transparent, the angle of view would be less than if all but one-quarter (90 degrees) of the LCDs 23 are opaque. Thus, as the arc of the sector of the mask 21 that passes light decreases, the angle of view of the object off of the optical axis increases. Manual operation of the joystick 11 controls the size of the mask aperture that passes light. Using the joystick 11, an operator thereby controls the angle from which the object is viewed, receiving immediate feedback from the image to achieve the preferred angle of view.

The angular position of the mask aperture 20a about the optical axis 20b is also selectable using the joystick 11. (See FIGS. 3A and 3b.) The angular position of the mask aperture 20a determines the direction from which the object is viewed. Thus, while in the typical imaging optical system, such as a microscope, an object is always viewed from the same location and from the same angular position (along the optical axis), the present invention permits both the angle at which the image is viewed and the direction from which the image is viewed to be selected by manual manipulation of the joystick handle 12.

Further, by manipulating the joystick handle 12 to continuously change (sweep) the direction of view (preferably at a given view angle) or the angle of view (preferably at a given view direction), motion parallax is created, giving rise to a moving 3D image of the object. Once again, reference is made to application Ser. No. 09/552,181 for a fuller explanation of the motion parallax phenomenon achieved by motion of a sector-shaped mask.

One of the important advantages of the present invention, and in particular, using a manual control for causing the motion parallax, is that by use of hand motion to produce the parallax, the hands-eye-brain connection of the operator is engaged, which permits the operator to perceive the elements of the image which are in the foreground and those that are in the background. Without the hand-eye-brain connection, there is a natural ambiguity as to what is in the foreground and what is in the background.

In one mode of operation, an investigator viewing an image of an object using the present invention positions the joystick handle 12 in a radial direction to select an angle of view. Once satisfied with the angle of view, the operator then moves the handle 12 angularly to change the direction of view until the object is seen to the operator's satisfaction. Alternatively, the operator selects a direction of view by angularly positioning the handle 12, and then by radially moving the handle 12, observes the object from varying angles.

The switches 13 are utilized to assist the operator by initiating various functional routines of operation.

When, for example, an operator finds an angle of view that is desirable, one of the switches 13 can be actuated (pressed) to lock in the angle of view by fixing the number of LCDs 23 that are opaque and those that are transparent. When so fixed, subsequent movement of the handle 12 does not change the arrangement of opaque and transparent LCDs 23 until the locking feature is deactivated (as by releasing or toggling the switch 13 that initiated the procedure). When so fixed, the operator can rotate the handle 12 and only the direction of view changes. Similarly, another of the switches 13 can be actuated in order to fix the direction of view from which the operator can change the angle of view without any change in the direction of view. In both of the aforementioned situations, continuous changes in the angle of view (in the one case) and continuous changes in the direction of view (in the other case) produces motion parallax and a 3D image.

Another of the switches 13 can be actuated in order to generate an electrical signal that produces a continuous rotation of the aperture (transparent LCDs 23) about the center of mask 21 (optical axis) to create motion parallax for 3D viewing, as more fully set forth in my aforementioned application Ser. No. 09/552,181.

In order to maintain constant light intensity, the controller 14 can modulate the illumination source 26 by increasing and decreasing the voltage to the light source as the amount of the light beam that is occluded by the mask 21 increases and decreases. This feature can be automatically implemented or selectively activated by one of the switches 13. Other methods to control light intensity can be utilized. such as rotating cross polarization filters or moving a graded neutral density filter.

Once a desired angle of view and direction of view is selected, one of the switches 13 can be operated to activate a camera 27 to record the image. The controller 14 can be programmed so that stereo pair photos are taken in response to activation of one of the switches 13. When so actuated, after the first photo is taken, the mask 21 is automatically reconfigured so that the aperture position is changed by 180 degrees, at which position, a second photo is taken. Thus, with the present invention, it is possible to take stereo pair photographs of an object along any desired line of sight, and not just along the horizontal, as is presently the limitation of the prior art.

While the invention has been described with reference to a joystick as the manually operated manipulator that incorporates the hand-eye-brain connection to assist in interpreting a 3D view, the invention is not so limited. A mouse or the keys of a keyboard, a trackball or a touchpad could be employed to control the position and angle of view. More exotic devices, such as that shown in U.S. Pat. No. 5,488,362, could also be used to control the mask.

While the invention has been described with reference to a mask formed of LCD elements as the preferred embodiment, the use of a mechanical masking structure, such as those described in the referenced applications and driven by motors through appropriate gearing, are all within the scope of the invention.

It is also within the scope of the invention to create a mask 21 from an orthogonal array of LCDs forming pixel-like areas that can be controlled to be either opaque or transparent. As described in my referenced co-pending applications, the same sector-shaped apertures and movement of the apertures can be achieved using signals that control the pixel-like LCDs to achieve the same result as that described above utilizing sector-shaped LCDs.

It is also within the scope of the invention for the camera 27 to be a video camera which receives the image formed through the mask 21. The video camera 27 could then transmit the image to a monitor (not shown) for viewing, either at the site at which the object was being examined or at some remote site.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. In an optical imaging system having an objective aperture, the combination comprising:
   a mask disposed at the objective aperture having a variable-size, angularly positionable, sector-shaped aperture;
   a manually operated manipulator for selecting the size of the sector-shaped aperture and the angular position of the sector-shaped aperture.

2. The combination of claim 1, further comprising:
   an electronic control system which generates signals in response to operation of said manipulator, which signals determine the size and position of the aperture.

3. The combination of claim 2, wherein said manipulator is a joystick having a handle on a support post and having freedom of movement angularly and radially.

4. The combination of claim 2, wherein said control system generates a fixed-position signal that fixes the position of the aperture of said mask so that subsequent operation of said manually operated manipulator does not change the angular position of the aperture.

5. The combination of claim 4, further comprising a switch on said manipulator wherein the fixed-position signal is generated in response to operation of said first switch.

6. The combination of claim 4, wherein said control system generates a signal that continuously changes the size of the aperture.

7. The combination of claim 6, further comprising a switch on said manually operated manipulator wherein the signal that continuously changes the size of the aperture is generated in response to operation of said switch.

8. The combination of claim 2, wherein said control system generates a fixed-size signal that fixes the size of the aperture so that subsequent operation of said manually operated manipulator does not change the size of the aperture.

9. The combination of claim 8, further comprising a switch on said manipulator wherein the fixed size-signal is generated in response to operation of said switch.

10. The combination of claim 8, wherein said control system generates a signal that continuously changes the position of the aperture.

11. The combination of claim 10, further comprising a second switch on said manipulator wherein the signal that continuously changes the position of the aperture is generated in response to operation of said second switch.

12. The combination of claim 1, wherein said mask is formed from a plurality of sector-shaped LCDs.

13. The combination of claim 1, wherein said mask is formed from a plurality of LCD pixels.

14. The combination of claim 2, wherein said control system generates a signal that causes the position of the aperture to change by 180 degrees.

15. The combination of claim 14, further comprising a switch on said manipulator wherein the signal that changes the position of the aperture by 180 degrees is generated in response to operation of said switch on said manually operated manipulator.

16. The combination of claim 2, further comprising:

a variable intensity light source; and said control system generating a signal that causes the intensity of said light source to vary whenever a control signal is generated to cause the size of the aperture to vary.

17. The combination of claim 16, wherein the intensity of said light source is increased as the size of the aperture is decreased, and the intensity of said light source is decreased as the size of the aperture is increased.

18. The combination of claim 17, wherein the signals controlling the size of the aperture in said mask and the intensity of said variable light source cause the amount of the light through the aperture to remain essentially constant.

* * * * *